(12) United States Patent
Takatani et al.

(10) Patent No.: US 12,060,630 B2
(45) Date of Patent: Aug. 13, 2024

(54) GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Yoshihiro Arita, Tokyo (JP); Shunsuke Okumura, Tokyo (JP); Shohji Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 601 days.

(21) Appl. No.: 17/422,471

(22) PCT Filed: Jan. 16, 2020

(86) PCT No.: PCT/JP2020/001177
§ 371 (c)(1),
(2) Date: Jul. 13, 2021

(87) PCT Pub. No.: WO2020/149338
PCT Pub. Date: Jul. 23, 2020

(65) Prior Publication Data
US 2022/0090245 A1  Mar. 24, 2022

(30) Foreign Application Priority Data
Jan. 16, 2019  (JP) ................. 2019-005084

(51) Int. Cl.
*C21D 3/04* (2006.01)
*C21D 8/02* (2006.01)
(Continued)

(52) U.S. Cl.
CPC ............ *C22C 38/54* (2013.01); *C21D 8/0205* (2013.01); *C21D 8/0226* (2013.01);
(Continued)

(58) Field of Classification Search
CPC ...................................................... C22C 38/54
See application file for complete search history.

(56) References Cited

U.S. PATENT DOCUMENTS

| 3,856,568 A | 12/1974 | Tanaka et al. |
| 2001/0030001 A1 | 10/2001 | Hayakawa et al. |

(Continued)

FOREIGN PATENT DOCUMENTS

| CN | 1462315 A | 12/2003 |
| CN | 107849656 A | 3/2018 |

(Continued)

*Primary Examiner* — Christopher S Kessler
(74) *Attorney, Agent, or Firm* — Birch, Stewart, Kolasch & Birch, LLP

(57) ABSTRACT

This grain-oriented electrical steel sheet does not have a forsterite film present between a base steel sheet and a tension-insulation coating, in which the base steel sheet contains a predetermined element in a predetermined amount, and in a case in which a cross section perpendicular to a rolling direction of the base steel sheet is viewed, when a region having a length of 10 μm from a surface of the base steel sheet toward the inside of the base steel sheet in a sheet thickness direction of the base steel sheet and a length of 20 mm in a direction perpendicular to the sheet thickness direction is an observation region, needle-like inclusions having a length of 1 μm or more are not present in the observation region.

2 Claims, 3 Drawing Sheets

(51) Int. Cl.
    *C22C 38/00*     (2006.01)
    *C22C 38/02*     (2006.01)
    *C22C 38/04*     (2006.01)
    *C22C 38/06*     (2006.01)
    *C22C 38/54*     (2006.01)

(52) U.S. Cl.
    CPC .......... *C22C 38/001* (2013.01); *C22C 38/002* (2013.01); *C22C 38/02* (2013.01); *C22C 38/04* (2013.01); *C22C 38/06* (2013.01); *C21D 2201/05* (2013.01)

(56) References Cited

U.S. PATENT DOCUMENTS

| | | |
|---|---|---|
| 2003/0188806 A1 | 10/2003 | Fujii et al. |
| 2005/0217761 A1 | 10/2005 | Ushigami et al. |
| 2012/0103474 A1 | 5/2012 | Ushigami et al. |
| 2015/0155085 A1 | 6/2015 | Gabor et al. |
| 2015/0187473 A1 | 7/2015 | Imamura et al. |
| 2017/0194082 A1 | 7/2017 | Murakami et al. |
| 2018/0202018 A1 | 7/2018 | Imamura et al. |
| 2022/0081746 A1* | 3/2022 | Takatani .............. C21D 8/1272 |
| 2022/0081747 A1* | 3/2022 | Takatani ................ C21D 10/00 |
| 2022/0090240 A1* | 3/2022 | Takatani ................. C22C 38/06 |
| 2022/0090246 A1* | 3/2022 | Takatani .............. C21D 8/1277 |

FOREIGN PATENT DOCUMENTS

| | | |
|---|---|---|
| JP | 48-39338 A | 6/1973 |
| JP | 7-118749 A | 5/1995 |
| JP | 7-118750 A | 5/1995 |
| JP | 7-126751 A | 5/1995 |
| JP | 7-278670 A | 10/1995 |
| JP | 8-3648 A | 1/1996 |
| JP | 9-49028 A | 2/1997 |
| JP | 11-106827 A | 4/1999 |
| JP | 2000-38615 A | 2/2000 |
| JP | 2003-268450 A | 9/2003 |
| JP | 2015-526597 A | 9/2015 |
| NL | 1007473 C1 | 12/1998 |
| RU | 2 595 190 C1 | 8/2016 |
| WO | WO 2011/007771 A1 | 1/2011 |
| WO | WO 2016/002904 A1 | 1/2016 |

\* cited by examiner

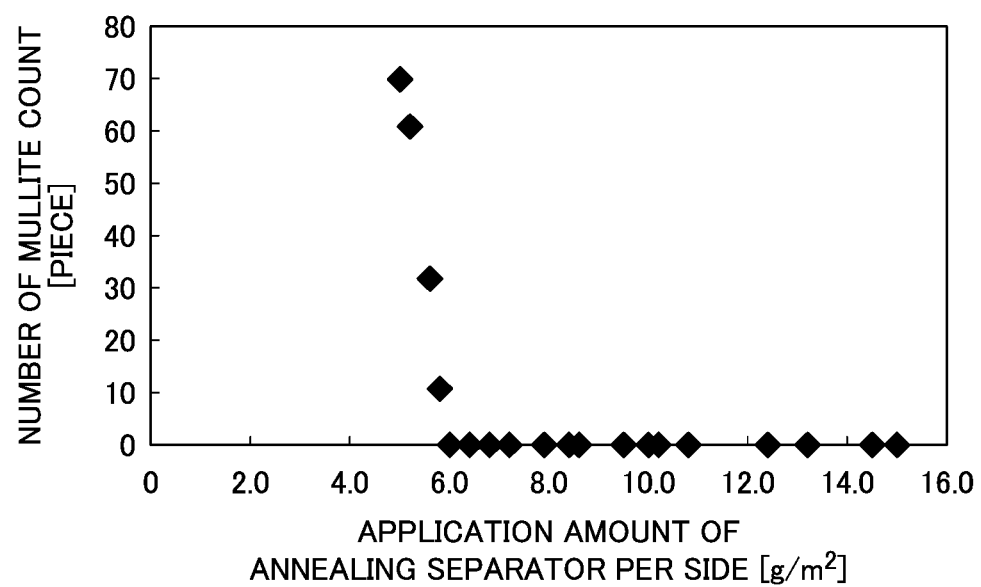

GRAIN-ORIENTED ELECTRICAL STEEL SHEET

TECHNICAL FIELD

The present invention relates to a grain-oriented electrical steel sheet having excellent magnetic characteristics suitable as an iron core material of a transformer. Priority is claimed on Japanese Patent Application No. 2019-005084 filed in Japan on Jan. 16, 2019, the content of which is incorporated herein by reference.

BACKGROUND ART

Grain-oriented electrical steel sheets are mainly used for transformers. Since a transformer is continuously excited for a long period of time from installation to disposal and continuous energy loss is caused, the energy loss when it is magnetized by an alternating current, that is, the iron loss, is a major indicator that determines the performance of a transformer. Generally, a grain-oriented electrical steel sheet includes a base steel sheet containing 7% by mass or less of Si and having a texture controlled so that a crystal orientation of each grain is aligned with a {110}<001> orientation called the Goth orientation, and an insulation coating for imparting insulation properties to the base steel sheet.

In order to reduce the iron loss of grain-oriented electrical steel sheets, many methods have been proposed so far. For example, a method of increasing alignment in the Goth orientation in a texture of a base steel sheet, a method of increasing an amount of a solid solution element such as Si that increases the electrical resistance in a base steel sheet, a method of reducing a sheet thickness of a base steel sheet, and the like are known.

Also, it is known that applying tension to a base steel sheet is an effective method for reducing iron loss. In order to apply tension to a base steel sheet, it is effective to form a film formed of a material having a thermal expansion coefficient smaller than that of the base steel sheet on a surface of the base steel sheet at a high temperature.

A forsterite film that is formed when oxides present on a surface of a base steel sheet react with an annealing separator in a final annealing process can apply tension to a base steel sheet. Since unevenness is present at an interface between the forsterite film and the base steel sheet, the forsterite film also functions as an intermediate film that enhances adhesion between the insulation coating and the base steel sheet by an anchor effect due to the unevenness.

A method of forming an insulation coating by baking a coating liquid mainly composed of colloidal silica and phosphate, which is disclosed in Patent Document 1, has a large effect on applying tension to a base steel sheet and is effective in reducing iron loss. Therefore, applying an insulation coating mainly composed of phosphate after leaving a forsterite film formed in a final annealing process is a general method of manufacturing a grain-oriented electrical steel sheet. Further, in the specification of the present application, an insulation coating capable of applying tension as well as insulation properties to the base steel sheet is referred to as a tension-insulation coating.

On the other hand, in recent years, it has become apparent that a forsterite film hinders domain wall motion and adversely affects iron loss. In a grain-oriented electrical steel sheet, magnetic domains change with domain wall motion under an alternating magnetic field. Smooth domain wall motion is effective in improving iron loss, but domain wall motion is hindered due to unevenness present at an interface between the forsterite film and the base steel sheet, as a result, it has been found that an effect of improving iron loss by applying tension is canceled out and a sufficient effect of improving iron loss cannot be obtained.

Therefore, a technology for inhibiting formation of a forsterite film and smoothing a surface of a base steel sheet has been developed. For example, in Patent Documents 2 to 5, a technology for smoothing a surface of a base steel sheet without forming a forsterite film after final annealing by controlling a dew point in an atmosphere of decarburization annealing and using alumina as an annealing separator has been disclosed.

CITATION LIST

Patent Document

[Patent Document 1]
Japanese Unexamined Patent Application, First Publication No. S48-039338
[Patent Document 2]
Japanese Unexamined Patent Application, First Publication No. H07-278670
[Patent Document 3]
Japanese Unexamined Patent Application, First Publication No. H11-106827
[Patent Document 4]
Japanese Unexamined Patent Application, First Publication No. H07-118750
[Patent Document 5]
Japanese Unexamined Patent Application, First Publication No. 2003-268450

SUMMARY OF THE INVENTION

Problems to be Solved by the Invention

As in the conventional technologies described above, it is thought that, when a forsterite film is not formed on a surface of the base steel sheet, since unevenness that hinders domain wall motion is not present on the surface of the base steel sheet, iron loss of the grain-oriented electrical steel sheet can be improved. However, even with these technologies, an effect of improving iron loss could not be sufficiently obtained.

The present invention has been made in view of the above circumstances, and an object thereof is to reduce the iron loss of a grain-oriented electrical steel sheet in which a forsterite film is not present between a base steel sheet and a tension-insulation coating compared with in conventional cases.

Means for Solving the Problem

In order to solve the above-described problems, the present inventors have conducted intensive research on the cause of not being able to obtain a sufficient effect of improving iron loss when a grain-oriented electrical steel sheet in which a forsterite film is not present between a base steel sheet and a tension-insulation coating is manufactured. As a result, it has been found that a large number of needle-like inclusions are present in a surface layer region of the base steel sheet in a grain-oriented electrical steel sheet in which a sufficient effect of improving iron loss cannot be obtained.

The present inventors have speculated that these needle-like inclusions are a cause that hinders domain wall motion, that is, a cause that adversely affects iron loss, and as a result of conducting further research, it has been found that, when the following conditions are satisfied, iron loss of the grain-oriented electrical steel sheet in which a forsterite film is not present between the base steel sheet and the tension-insulation coating can be reduced compared with in conventional cases.

<Conditions>

In a case in which a cross section perpendicular to a rolling direction of a base steel sheet is viewed when a region having a length of 10 μm from a surface of the base steel sheet toward the inside of the base steel sheet in a sheet thickness direction of the base steel sheet and a length of 20 mm in a direction perpendicular to the sheet thickness direction is an observation region, needle-like inclusions having a length of 1 μm or more are not present in the observation region.

The present invention has been made on the basis of the above-described findings, and the gist thereof is as follows.

(1) A grain-oriented electrical steel sheet according to one aspect of the present invention is a grain-oriented electrical steel sheet in which a forsterite film is not present between a base steel sheet and a tension-insulation coating. In the grain-oriented electrical steel sheet, the base steel sheet contains 0.085% by mass or less of C, 0.80 to 7.00% by mass of Si, 0.05 to 1.00% by mass of Mn, 0.065% by mass or less of acid-soluble Al, 0.003% by mass or less of S, 0.0040% by mass or less of N, 0.0005 to 0.0080% by mass of B, 0 to 0.50% by mass of P, 0 to 1.00% by mass of Ni, 0 to 0.30% by mass of Sn, 0 to 0.30% by mass of Sb, 0 to 0.40% by mass of Cu, 0 to 0.30% by mass of Cr, and 0 to 0.01% by mass of Bi, and a remainder of Fe and impurities as a chemical composition thereof, and in a case in which a cross section perpendicular to a rolling direction of the base steel sheet is viewed, when a region having a length of 10 μm from a surface of the base steel sheet toward the inside of the base steel sheet in a sheet thickness direction of the base steel sheet and a length of 20 mm in a direction perpendicular to the sheet thickness direction is an observation region, needle-like inclusions having a length of 1 μm or more are not present in the observation region.

(2) In the grain-oriented electrical steel sheet according to above-described (1), the needle-like inclusion may contain mullite represented by $3Al_2O_3 \cdot 2SiO_2$.

Effects of the Invention

According to the above-described aspect of the present invention, iron loss of the grain-oriented electrical steel sheet in which a forsterite film is not present between the base steel sheet and the tension-insulation coating can be reduced as compared with conventional cases.

BRIEF DESCRIPTION OF DRAWINGS

FIG. 4 is a diagram showing a relationship between an application amount of the annealing separator per side and the number of mullite.

EMBODIMENTS FOR IMPLEMENTING THE INVENTION

Figure 1:
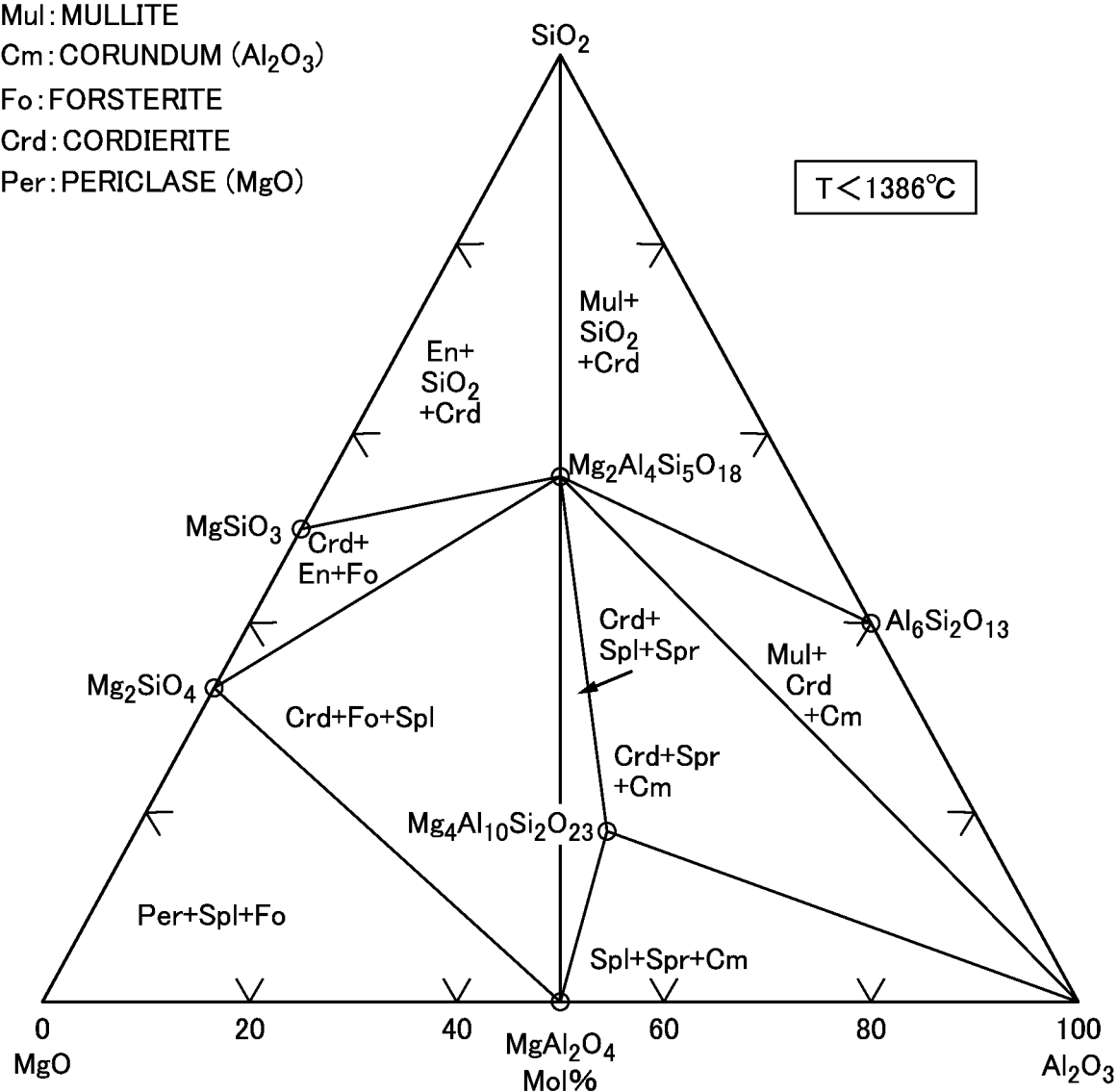
FIG. 1 is a ternary phase diagram of $Al_2O_3$—MgO—$SiO_2$.

A grain-oriented electrical steel sheet according to one embodiment of the present invention is a grain-oriented electrical steel sheet in which a forsterite film is not present between a base steel sheet and a tension-insulation coating. Hereinafter, the grain-oriented electrical steel sheet according to the present embodiment is abbreviated as "the present electrical steel sheet", and a surface of the base steel sheet is abbreviated as a "steel sheet surface".

The present electrical steel sheet is characterized in that, in a case in which a cross section (C cross section) perpendicular to a rolling direction of the base steel sheet is viewed, when a region having a length of 10 μm from the steel sheet surface toward the inside of the base steel sheet in a sheet thickness direction of the base steel sheet and a length of 20 mm in a direction perpendicular to the sheet thickness direction (sheet width direction) is an observation region, needle-like inclusions having a length of 1 μm or more are not present in the observation region.

In the following, a length of the observation region in the sheet thickness direction of the base steel sheet is referred to as a "sheet thickness direction length," and a length of the observation region in the sheet width direction of the base steel sheet is referred to as a "sheet width direction length".

Hereinafter, the present electrical steel sheet will be described.

The present inventors postulated that one of the reasons why the iron loss could not be sufficiently reduced in a grain-oriented electrical steel sheet in which a forsterite film is not present between a base steel sheet and a tension-insulation coating might be that inclusions adversely affecting magnetism were formed during final annealing, and took a sample from an (inferior) grain-oriented electrical steel sheet having a large iron loss so that a cross section (C cross section) perpendicular to a rolling direction of the base steel sheet was exposed to observe the sample cross section with a microscope.

As a result, in a case of the grain-oriented electrical steel sheet having large iron loss, it was found that a large number of needle-like inclusions were present in a surface layer region of the base steel sheet appeared in the C cross section, more specifically, a region having a length of 10 μm from the steel sheet surface toward the inside of the base steel sheet in the sheet thickness direction of the base steel sheet. Further, it was found that these needle-like inclusions contained mullite ($3Al_2O_3 \cdot 2SiO_2$). These observation results are findings that serve as a basis of the present invention.

In manufacturing a grain-oriented electrical steel sheet, decarburization annealing is performed for the purpose of removing C (carbon) before final annealing. In the decarburization annealing, C is removed, and at the same time, a $SiO_2$ film is formed on the steel sheet surface. After the decarburization annealing, final annealing is performed with an annealing separator containing alumina as a main component applied on the $SiO_2$ film on the steel sheet surface for the purpose of preventing the base steel sheet coiled in a coil shape from seizing during the final annealing.

Since mullite is a complex oxide of alumina ($Al_2O_3$) and $SiO_2$, it is conceivable that mullite will be formed and remain due to insufficient removal of the $SiO_2$ that has been formed by the decarburization annealing during the final annealing.

Initially, the $SiO_2$ formed in the decarburization annealing is adsorbed on the alumina having a high BET specific surface area contained in the annealing separator during the final annealing and is removed from the steel sheet surface when the annealing separator is washed with water after the final annealing. Therefore, as a cause of insufficient removal of the $SiO_2$ formed in the decarburization annealing, an insufficient application amount of the annealing separator is conceivable.

That is, it is conceivable that there was a limit to an amount of the $SiO_2$ that could be adsorbed per unit weight of alumina, an application amount of the annealing separator was insufficient, all the $SiO_2$ was not adsorbed and removed, and the $SiO_2$ remained on the steel sheet surface. As a result, it is conceivable that Al (Al generated by decomposition of AlN that functions as an inhibitor), which has moved from the inside of the base steel sheet toward the steel sheet surface during the final annealing, reacts with the $SiO_2$ remaining on the steel sheet surface, and thereby mullite is formed and remains inside the base steel sheet (particularly in a surface layer region near the steel sheet surface).

Based on a technical idea of inhibiting formation of mullite by adjusting a component composition and an application amount of the annealing separator, the present inventors have intensively studied a component composition and an application amount of the annealing separator that can inhibit formation of mullite. As a result, it was found that the formation of mullite can be inhibited by adding MgO to an annealing separator containing alumina as a main component in a specific proportion and controlling an application amount of the annealing separator such that it is within a specific range.

FIG. 1 shows a ternary phase diagram of alumina $Al_2O_3$—MgO—$SiO_2$. As shown in FIG. 1, theoretically, when MgO is present in a proportion of 50 mol % (28% by mass) or more with respect to alumina, mullite is not formed. Therefore, the present inventors investigated a relationship between an amount of MgO added to the annealing separator containing alumina as a main component and the number of mullite formed in the surface layer region of the base steel sheet.

A decarburization-annealed sheet having a sheet thickness of 0.23 mm was used as a test material, and an annealing separator containing alumina was applied to the decarburization-annealed sheet at an application amount of 8.0 g/m$^2$ per side while varying an addition amount of MgO in a range of 0 to 80% by mass. After the annealing separator was dried, the decarburization-annealed sheet was subjected to final annealing, and a grain-oriented electrical steel sheet in which a forsterite film was not present on a surface of a base steel sheet was obtained. Further, the final annealing was executed by stacking the decarburization-annealed sheets coated with the annealing separator.

The steel sheets after the final annealing obtained in this way were washed with water to remove a surplus annealing separator, and then a test piece of 20 mm square was taken from each of the steel sheets after the final annealing from which the surplus annealing separator had been removed. A cross section (C cross section) perpendicular to a rolling direction of the test piece was polished with a diamond buff and then observed with a microscope at a magnification of 1000 times, and the number of needle-like inclusions having a length of 1 μm or more that were present in a region (observation region) having a length of 10 μm from a steel sheet surface toward the inside of the base steel sheet in a sheet thickness direction of the base steel sheet and a length of 20 mm in a sheet width direction of the base steel sheet was measured. The needle-like inclusion was defined as an inclusion in which a maximum major axis/maximum minor axis was 10 or more.

Next, an iron loss ($W_{17/50}$) was measured in the test pieces having different amounts of MgO added to the annealing separator, and an average at 10 points was taken as an iron loss ($W_{17/50}$) of a test piece.

Figure 2:
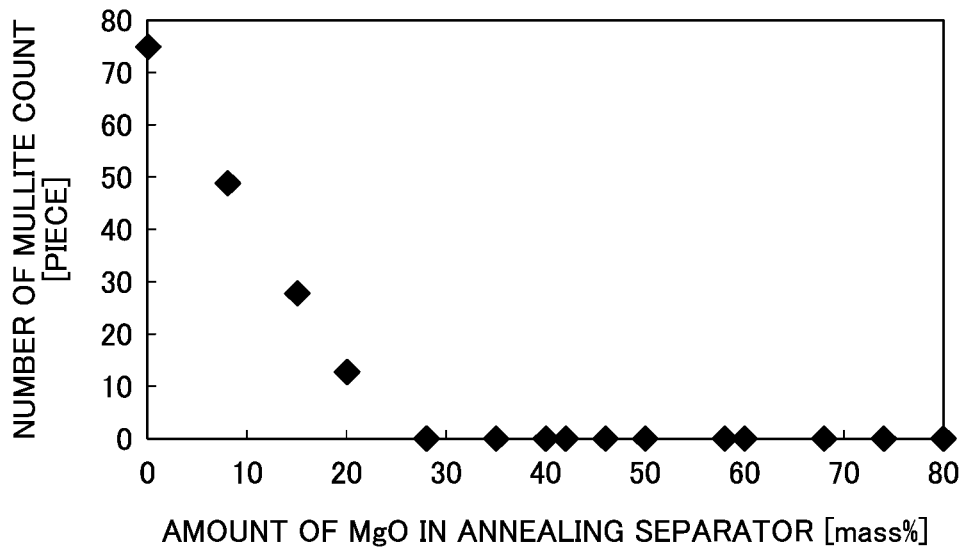
FIG. 2 is a diagram showing a relationship between an amount of MgO by mass % in an annealing separator and the number of mullite.
Figure 3:
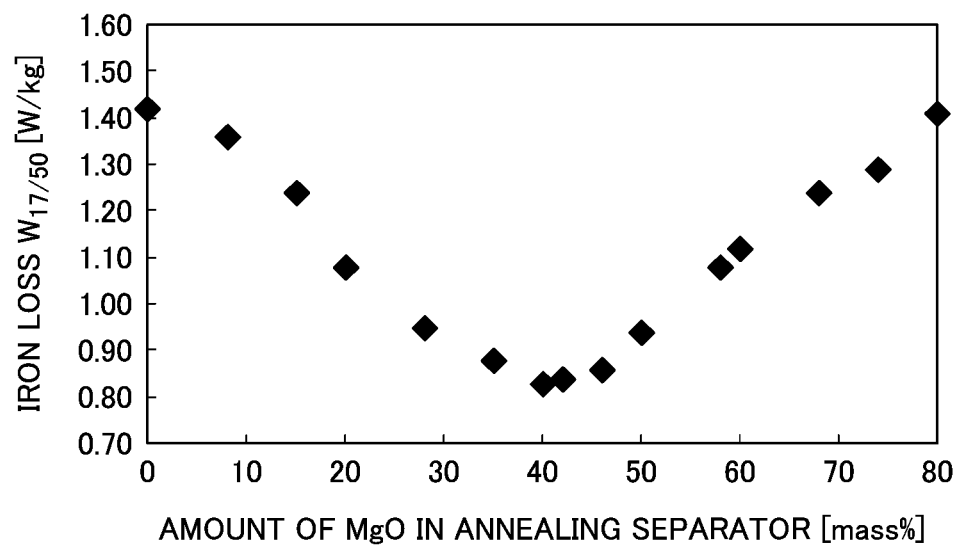
FIG. 3 is a diagram showing a relationship between an amount of MgO by mass % in the annealing separator and an iron loss ($W_{17/50}$).

Measurement results of these are shown in FIGS. 2 and 3. FIG. 2 is a diagram showing a relationship between an amount of MgO in the annealing separator and the number of mullite. FIG. 3 is a diagram showing a relationship between an amount of MgO in the annealing separator and iron loss ($W_{17/50}$).

As shown in FIG. 2, when the amount of MgO in the annealing separator was 28% by mass or more, mullite was not formed. On the other hand, as shown in FIG. 3, it can be seen that when the amount of MgO in the annealing separator was within a range of 28% by mass or more and 50% by mass or less, the iron loss was less than 1.00 W/kg, and an effect of the iron loss being improved was exhibited, but when the amount of MgO in the annealing separator exceeded 50% by mass, the iron loss was 1.00 W/kg or more, and an inferior iron loss was exhibited.

In order to clarify the cause, a surface of the obtained steel sheet was analyzed by an X-ray diffraction (XRD) method. As a result, it was ascertained that forsterite was detected when the amount of MgO was 54% by mass or more, and that an XRD peak height of the forsterite increased as the amount of MgO increased. From this, it is conceivable that, when the amount of MgO in the annealing separator exceeds 50% by mass, mullite is not formed (see FIG. 2), but on the other hand, forsterite is formed to cause inferior iron loss.

Next, an annealing separator containing alumina as a main component and MgO in an amount of 45% by mass was applied to a decarburization-annealed sheet having a sheet thickness of 0.23 mm. An application amount of the annealing separator was varied in a range of 5.0 to 15.0 g/m$^2$ per side. A plurality of decarburization-annealed sheets coated with the annealing separator and dried were stacked and subjected to final annealing to fabricate grain-oriented electrical steel sheets.

The grain-oriented electrical steel sheets obtained in this way were washed with water to remove a surplus annealing separator, and then a test piece of 20 mm square was taken from each of the grain-oriented electrical steel sheets from which the surplus annealing separator had been removed. A cross section (C cross section) perpendicular to a rolling direction of the test piece was polished with a diamond buff and then observed with a microscope at a magnification of 1000 times, and the number of needle-like inclusions having a length of 1 μm or more that were present in a region (observation region) having a length of 10 μm from a steel sheet surface toward the inside of a base steel sheet in a sheet thickness direction of the base steel sheet and a length of 20 mm in a sheet width direction of the base steel sheet was measured.

The results are shown in FIG. 4. FIG. 4 is a diagram showing a relationship betw een an application amount of the annealing separator per side and the number of mullite. From FIG. 4, it can be seen that "needle-like inclusions (mullite) having a length of 1 μm or more" were formed when the application amount of the annealing separator per side was less than 6.0 g/m$^2$.

Since mullite is not formed when MgO is present in a proportion of 50 mol % (28% by mass) or more with respect to alumina according to the ternary phase diagram of $Al_2O_3$—MgO—$SiO_2$ shown in FIG. 1, mullite should not be formed when the application amount of MgO is 45% by mass. However, as shown in FIG. 4, "needle-like inclusions (mullite) having a length of 1 μm or more" were formed when the application amount of the annealing separator containing 45% by mass of MgO per side was less than 6.0 g/m². The reason for this can be considered as follows.

(x) When an application amount of the annealing separator is small, adsorption and removal of $SiO_2$ by $Al_2O_3$ of the annealing separator becomes insufficient during final annealing.

(y) During final annealing, Al generated by decomposition of AlN (inhibitor) is added to an Al component of the annealing separator, a proportion of MgO in the annealing separator is relatively reduced, and a component composition of the annealing separator shifts to a mullite forming region (see FIG. 1).

Therefore, it is important to adsorb and remove $SiO_2$ with the $Al_2O_3$ of the annealing separator sufficiently during the final annealing in order to inhibit the formation of mullite, and for that purpose, not only is it necessary to perform control such that the amount of MgO added to the annealing separator is 28% by mass or more, but in addition, it is necessary to perform control such that the application amount of the annealing separator is 6.0 g/m² or more.

As described above, the present inventors found that, when an MgO addition amount and an application amount of the annealing separator containing alumina as a main component were controlled within a specific range, formation of the needle-like inclusions (mullite) could be inhibited in the surface layer region of the base steel sheet of the grain-oriented electrical steel sheet, and thereby reduction in iron loss of the grain-oriented electrical steel sheet could be realized. That is because the present electrical steel sheet is characterized in that, in a case in which the C cross section of the base steel sheet is viewed, when a region having a sheet thickness direction length of 10 μm from the steel sheet surface toward the inside of the base steel sheet and a sheet width direction length of 20 mm is an obseration region, the needle-like inclusions having a length of 1 μm or more are not present in the observation region on the basis of the above-described research results by the present inventors.

Further, an upper limit of a length of the needle-like inclusion in the observation region of the grain-oriented electrical steel sheet having a large iron loss is not particularly limited, and may be, for example, 5 μm.

Hereinafter, characteristics of the present electrical steel sheet will be described.

<Sheet thickness direction length of observation region: 10 μm>

When the needle-like inclusions are present in the surface layer region of the base steel sheet appeared in the C cross section, that is the region having a length of 10 μm from the steel sheet surface toward the inside of the base steel sheet, since domain wall motion is hindered and thus reduction in iron loss becomes difficult, and a thickness of $SiO_2$ formed on a surface of the decarburization-annealed sheet is about several micrometers, a sheet thickness direction length of the observation region for measuring the number of needle-like inclusions is set to 10 μm.

<Needle-like inclusion having length of 1 μm or more is not present in observation region with sheet width direction length of 20 mm>

As described above, the needle-like inclusion having a length of 1 μm or more is an inclusion in which a maximum major axis/maximum minor axis is 10 or more. Since the needle-like inclusions hinder domain wall motion significantly, the present inventors focused on the number of needle-like inclusions present inside the grains in the observation region.

In the C cross-section polishing of the base steel sheet with a diamond buff, a sample length in which a uniform and smooth polished surface can be obtained is about 20 mm. Therefore, in order to accurately measure the number of "needle-like inclusions having a length of 1 μm or more" that hinder domain wall motion significantly, a sheet width direction length of the observation region was set to 20 mm, and the number of needle-like inclusions having a length of 1 μm or more present in the observation region was measured.

As a result, it was found that the iron loss $W_{17/50}$ could be reduced to less than 1.00 W/kg when the needle-like inclusions having a length of 1 μm or more were not present in the observation region (when the number of needle-like inclusions in the observation region was zero), but on the other hand, the iron loss $W_{17/50}$ increased to more than 1.00 W/kg when the needle-like inclusions having a length of 1 μm or more were present in the observation region (see Table 2). Therefore, from the perspective of reducing iron loss, it is an essential condition that the needle-like inclusions (mullite) having a length of 1 μm or more are not present in the observation region.

Identification of substances constituting needle-like inclusions can be performed by qualitative analysis using a wide-angle X-ray diffraction (WAXD) method for the needle-like inclusions. For example, a test piece cut out from the base steel sheet is immersed in a nital solution (5 vol % of nitric acid/ethanol) for 90 seconds, and a surface thereof is removed by about several microns to make needle-like inclusions appear. Ascertaining of the needle-like inclusions that have appeared can be performed using an optical microscope. The surface of the test piece on w hich the needle-like inclusions have appeared is analyzed by the wide-angle X-ray diffraction method Specifically, an obtained X-ray diffraction spectrum is collated with a power diffraction file (PDF). For identification of mullite, for example, JCPPS No.: 15-776 may be used, Since mullite is not formed in a portion of the base steel sheet other than the needle-like inclusions, whether or not the mullite is included in the needle-like inclusions can be determined by the method described above.

<Chemical Composition of Base Steel Sheet>

Next, a chemical composition (component composition) of the base steel sheet of the present electrical steel sheet will be described. The chemical composition of the base steel sheet is not limited to a specific composition as long as magnetic characteristics and mechanical characteristics required for the grain-oriented electrical steel sheet can be obtained, but an example of the chemical composition of the base steel sheet is as follows.

That is, the base steel sheet of the present electrical steel sheet contains 0.085% by mass or less of C, 0.80 to 7.00% by mass of Si, 0.05 to 1.00% by mass of Mn, 0.065% by mass or less of acid-soluble Al, 0.003% by mass or less of S, 0.0040% by mass or less of N, and 0.0005 to 0.0080% by mass of B, and a remainder of Fe and impurities as a chemical composition thereof.

Hereinafter, each of the elements will be described. In the following description, all "%" relating to the chemical composition denotes "% by mass".

C: 0.085% or less

C is an element effective for controlling a primary recrystallization structure, but since it adversely affects magnetic characteristics, it is an element removed by decarburization annealing before final annealing. When an amount of C exceeds 0.085% in a final product, aging precipitation occurs and hysteresis loss deteriorates, and therefore the amount of C is set to 0.085% or less. The amount of C is preferably 0.070% or less, and more preferably 0.050% or less.

A lower limit thereof includes 0%, but when the amount of C is reduced to less than 0.0001%, a manufacturing cost increases significantly, and therefore 0.0001% is a practical lower limit on a practical steel sheet. In the grain-oriented electrical steel sheet, the amount of C is normally reduced to about 0.002% or less by decarburization annealing.

Si: 0.80 to 7.00%

Si is an element that increases electric resistance of a steel sheet and improves iron loss characteristics. When an amount of Si is less than 0.80%, y transformation occurs during final annealing, a crystal orientation of the steel sheet is impaired, and therefore the amount of Si is set to 0.80% or more. The amount of Si is preferably 1.50% or more, and more preferably 2.50% or more.

On the other hand, when the amount of Si exceeds 7.00%, processability decreases and cracks occur during rolling, and therefore the amount of Si is set to 7.00% or less. The amount of Si is preferably 5.50% or less, and more preferably 4.50% or less.

Mn: 0.05 to 1.00%

Mn is an austenite-forming element and is an element that prevents cracking during hot rolling and combines with S and/or Se to form MnS and/or MnSe that function as an inhibitor.

Mn is an element that prevents cracking during hot rolling and combines with S to form MnS that functions as an inhibitor. When an amount of Mn is less than 0.05%, an addition effect is not sufficiently exhibited, and therefore the amount of Mn is set to 0.05% or more. The amount of Mn is preferably 0.07% or more, and more preferably 0.09% or more.

On the other hand, when the amount of Mn exceeds 1.00%, precipitation and dispersion of MnS become non-uniform, a required secondary recrystallization structure cannot be obtained, a magnetic flux density decreases, and therefore the amount of Mn is set to 1.00% or less. The amount of Mn is preferably 0.80% or less, and more preferably 0.60% or less.

Acid-soluble Al: 0.065% or less

Acid-soluble Al is an element that combines with N to generate (Al, Si) N that function as an inhibitor. When the amount of acid-soluble Al exceeds 0.065%, precipitation and dispersion of (Al, Si) N become non-uniform, a required secondary recrystallization structure cannot be obtained, a magnetic flux density decreases, and therefore the amount of acid-soluble Al is set to 0.065% or less. The amount of acid-soluble Al is preferably 0.050% or less, and more preferably 0.040% or less. A lower limit thereof includes 0%, but when the amount of acid-soluble Al is reduced to less than 0.0001%, a manufacturing cost increases significantly, and therefore 0.0001% is a practical lower limit on the practical steel sheet. The amount of acid-soluble Al is normally reduced to 0.002% or less by final annealing.

S: 0.003% or less

S combines with Mn to function as an inhibitor, but when an amount of S exceeds 0.003% in a final product, it is precipitated as MnS in the steel sheet and hysteresis loss increases, and therefore the amount of S is set to 0.003% or less. A lower limit thereof includes 0%, but when the amount of S is reduced to less than 0.0001%, a manufacturing cost increases significantly, and therefore 0.0001% is a practical lower limit on the practical steel sheet.

The S content of the base steel sheet changes depending on the amount of MgO added to the annealing separator. When the amount of MgO added to the annealing separator is controlled to 28% by mass or more so that the needle-like inclusions (mullite) with a length of 1 µm or more are not present in the observation region appeared in the C cross section of the base steel sheet, the S content of the base steel sheet of the grain-oriented electrical steel sheet obtained as the final product is suppressed to 0.003% or less, and as a result, formation of fine sulfides is suppressed as described above, which contributes to reduction in iron loss.

Accordingly, the larger the amount of MgO added to the annealing separator is, the more preferable it is also from the perspective of reducing the S content of the base steel sheet, but forsterite is formed when the amount of MgO added to the annealing separator exceeds 50% by mass as described above, and therefore an upper limit of the amount of MgO added to the annealing separator needs to be controlled to 50% by mass.

N: 0.0040% or less

N is an element that combines with Al to form AlN that functions as an inhibitor, but when an amount thereof is more than 0.0040% in a final product, it is precipitated as AlN in the steel sheet and hysteresis loss increases, and therefore the amount of N is set to 0.0040% or less. A lower limit thereof includes 0%, but when the amount of N is reduced to less than 0.0001%, a manufacturing cost increases significantly, and therefore 0.0001% is a practical lower limit on the practical steel sheet. Further, in the grain-oriented electrical steel sheet, the amount of N is normally reduced to about 0.003% by final annealing.

B 0.0005 to 0.0080%

B is an element that combines with N and complex precipitates with MnS to form BN that functions as an inhibitor.

When an amount of B is less than 0.0005%, an addition elTect is not sufficiently exhibited, and therefore the amount of B is set to 0.0005% or more. The amount of B is preferably 0.0010% or more, and more preferably 0.0015% or more. On the other hand, when the amount of B exceeds 0.0080%, precipitation and dispersion of BN become non-uniform, a required secondary recrystallization structure cannot be obtained, and a magnetic flux density decreases, and therefore the amount of B is set to 0.0080% or less. The amount of B is preferably 0.0060% or less, and more preferablv 0.0040% or less.

In components of the base steel sheet, the remainder excluding the above-described elements is Fe and impurities. Impurities are elements that are inevitably mixed from a steel raw material and/or in the process of steelmaking and are elements that are allow ed w ithin a range not impairing characteristics of the present electrical steel sheet.

Also, the base steel sheet may contain at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi instead of a part of Fe within a range not impairing magnetic characteristics and enhancing other characteristics. Since these elements are not essential elements, a low er limit of each content of them is 0%.

The above-described steel components may be measured by a general method for analyzing a steel. For example, the steel components may be measured using inductively coupled plasma-atomic emission spectrometry (ICP-AES). Further, acid-soluble Al may be measured by ICP-AES using a filtrate obtained after the sample is decomposed by heating with an acid. Also, C and S may be measured using a combustion-infrared absorption method. N may be measured using an inert gas fusion-thermal conductivity method, and O may be measured using an inert gas fusion-nondispersive infrared absorption method.

<Determination of layer constituting grain-oriented electrical steel sheet>

In order to determine each layer in a cross-sectional structure of the present electrical steel sheet, a line analysis is performed in the sheet thickness direction and a quantitative analysis of chemical components of each layer is performed using EDS attached to SEM of TEM. Elements to be quantitatively analyzed are 6 elements of Fe, P, Si, O, Mg, and Al.

A region which is a layer-shaped region present at a deepest position in the sheet thickness direction and having an Fe content of 80 atomic % or more and an O content of less than 30 atomic % excluding measurement noise is determined to be a base steel sheet.

Regarding a region excluding the base steel sheet determined above, a region having a Fe content of less than 80 atomic %, a P content of 5 atomic % or more, and an O content of 30 atomic % or more excluding measurement noise is determined to be an insulation coating.

The present electrical steel sheet does not have a forsterite film on the base steel sheet. Presence or absence of the forsterite film on the base steel sheet can be ascertained by analyzing a surface of the steel sheet from which the insulation coating has been removed using an X-ray diffraction method. Specifically, an obtained X-ray diffraction spectrum is collated with a PDF. For example, JCPDS number: 34-189 may be used to determine presence or absence of the forsterite. In the present electrical steel sheet, even if the surface of the steel sheet from which the insulation coating has been removed is analyzed by the X-ray diffraction method, a peak of the forsterite is not detected. Further, the insulation coating from the present electrical steel sheet can be removed, for example, by immersing the present electrical steel sheet in a 20% NaOH aqueous solution at 80° C. for 20 minutes.

<Manufacturing Method of Present Electrical Steel Sheet>

Next, a manufacturing method of the present electrical steel sheet will be described.

<Silicon Steel Slab Component>

As components of a silicon steel slab of the present electrical steel sheet, 0.085% by mass or less of C, 0.80 to 7.00% by mass of Si, 0.05 to 1.00% by mass of Mn, 0.010 to 0.065% by mass of acid-soluble Al, 0.0040 to 0.0120% by mass of N, 0.010% by mass or less of S, and 0.0005 to 0.0080% by mass of B are contained.

C: 0.085% or less

C is an element effective for controlling a primary recrystallization structure, but since it adversely affects magnetic characteristics, it is an element removed by decarburization annealing before final annealing. When an amount of C exceeds 0.085%, a decarburization annealing time becomes long and productivity decreases, and therefore the amount of C is set to 0.085% or less. The amount of C is preferably 0.070% or less, and more preferably 0.050% or less.

A lower limit thereof includes 0%, but when the amount of C is reduced to less than 0.0001%, a manufacturing cost increases significantly, and therefore 0.0001% is a practical lower limit on the practical steel sheet. Further, in the grain-oriented electrical steel sheet, the amount of C is normally reduced to about 0.001% or less by decarburization annealing.

Si: 0.80 to 7.00%

Si is an element that increases electrical resistance of a steel sheet and improves iron loss characteristics. When an amount of Si is less than 0.80%, γ transformation occurs during final annealing, a crystal orientation of the steel sheet is impaired, and therefore the amount of Si is set to 0.80% or more. The amount of Si is preferably 1.50% or more, and more preferably 2.50% or more.

On the other hand, when the amount of Si exceeds 7.00%, processability decreases and cracks occur during rolling, and therefore the amount of Si is set to 7.00% or less. The amount of Si is preferably 5.50% or less, and more preferably 4.50% or less.

Mn: 0.05 to 1.00%

Mn is an element that prevents cracking during hot rolling and combines with S and/or Se to form MnS that functions as an inhibitor. When an amount of Mn is less than 0.05%, an addition effect is not sufficiently exhibited, and therefore the amount of Mn is set to 0.05% or more. The amount of Mn is preferably 0.07% or more, and more preferably 0.09% or more.

On the other hand, when the amount of Mn exceeds 1.00%, precipitation and dispersion of MnS become non-uniform, a required secondary recrystallization structure cannot be obtained, a magnetic flux density decreases, and therefore the amount of Mn is set to 1.00% or less. The amount of Mn is preferably 0.80% or less, and more preferably 0.60% or less.

Acid-soluble Al: 0.010 to 0.065%

Acid-soluble Al is an element that combines with N to form (Al, Si) N that functions as an inhibitor. When an amount of acid-soluble Al is less than 0.010%, an addition effect is not sufficiently exhibited and secondary recrystallization does not proceed sufficiently, and therefore the amount of acid-soluble Al is set to 0.010% or more. The amount of acid-soluble Al is preferably 0.015% or more, and more preferably 0.020% or more.

On the other hand, when the amount of acid-soluble Al exceeds 0.065%, precipitation and dispersion of (Al, Si) N become non-uniform, a required secondary recrystallization structure cannot be obtained, a magnetic flux density decreases, and therefore the amount of acid-soluble Al is set to 0.065% or less. The amount of acid-soluble Al is preferably 0.050% or less, and more preferably 0.040% or less.

N: 0.0040 to 0.0120%

N is an element that combines with Al to form AlN that functions as an inhibitor, but on the other hand, it is also an element that forms blisters (voids) in the steel sheet during cold rolling. When an amount of N is less than 0.0040%, formation of the AlN is insufficient, and therefore the amount of N is set to 0.0040% or more. The amount of N is preferably 0.0060% or more, and more preferably 0.0070% or more.

On the other hand, when the amount of N exceeds 0.0120%, there is a concern that blisters (voids) may be formed in the steel sheet during cold rolling, and therefore the amount of N is set to 0.0120% or less. The amount of N is preferably 0.0100% or less, and more preferably 0.0090% or less.

S: 0.010% or less

S is an element that combines with Mn to form MnS that functions as an inhibitor.

When an amount of S exceeds 0.010%, precipitation and dispersion of MnS become non-uniform, a desired secondary recrystallization structure cannot be obtained, a magnetic flux density decreases, hysteresis loss increases after purification, or MnS remains, and hysteresis loss increases after purification. A lower limit of the amount of S is not particularly set but is preferably 0.003% or more. The amount of S is more preferably 0.007% or more.

B: 0.0005 to 0.0080%

B is an element that combines with N and complex precipitates with MnS to form BN that functions as an inhibitor.

When an amount of B is less than 0.0005%, an addition effect is not sufficiently exhibited, and therefore the amount of B is set to 0.0005% or more. The amount of B is preferably 0.0010% or more, and more preferably 0.0015% or more. On the other hand, when the amount of B exceeds 0.0080%, precipitation and dispersion of BN become non-uniform, a required secondary recrystallization structure cannot be obtained, and a magnetic flux density decreases, and therefore the amount of B is set to 0.0080% or less. The amount of B is preferably 0.0060% or less, and more preferably 0.0040% or less.

In the silicon steel slab, the remainder excluding the above-described elements is Fe and impurities. Impurities are elements that are inevitably mixed from a steel raw material and/or in the process of steelmaking and are elements that are allowed within a range not impairing characteristics of the present electrical steel sheet Also, the silicon steel slab may contain at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi instead of a part of Fe within a range not impairing magnetic characteristics of the electrical steel sheet and enhancing other characteristics.

<Manufacturing process of present electrical steel sheet>

A molten steel having the above-described component composition is cast into a silicon steel slab by a normal method, and then subjected to nomial hot rolling to form a hot band, which is wound in a coil shape. Next, the hot band is subjected to hot-band annealing and then subjected to one cold rolling or a plurality of times of cold rolling with intemiediate annealing sandwiched therebetween to obtain a steel sheet of a final sheet thickness.

Next, decarburization annealing is performed on the steel sheet of the final thickness. The decarburization annealing is a heat treatment in wet hydrogen, reduces an amount of C in the steel sheet to an amount that does not cause magnetic aging in the product sheet, and causes primary recrystallization to occur in the steel sheet to be prepared for the next secondary recrystallization Further, nitriding annealing, which is annealing performed in an ammonia atmosphere, is performed to form an AlN inhibitor.

Next, the steel sheet after the decarburization annealing is subjected to final annealing at a temperature of 1100° C. or higher. This final annealing is a heat treatment performed in a form of a coil in which the steel sheet is coiled, but for the purpose of preventing seizure of the steel sheet, the final annealing is performed with an annealing separator containing alumina ($Al_2O_3$) as a main component and 28% by mass to 50% by mass of MgO applied to the steel sheet surface. An application amount of the annealing separator is 6.0 $g/m^2$ or more per side.

As described above, when the amount of MgO added to the annealing separator containing alumina as a main component is controlled in the range of 28% by mass to 50% by mass and the application amount of the annealing separator is controlled to 6.0 $g/m^2$ or more per side, it is possible to obtain a grain-oriented electrical steel sheet in which the needle-like inclusions (mullite) having a length of 1 μm or more are not present in the base steel sheet. An upper limit of the application amount of the annealing separator is not particularly limited, but from the perspective of cost, it is preferably 12.0 $g/m^2$ or less per side.

In order to effectively inhibit formation of the needle-like inclusions (mullite), it is preferable to control a BET specific surface area of alumina to 3 to 10 $m^2/g$ in the annealing separator containing $Al_2O_3$ as a main component. When the BET specific surface area of the alumina is controlled to 3 to 10 $m^2/g$, an amount of $SiO_2$ adsorbed by the alumina can be increased, and formation of the needle-like inclusions can be inhibited.

When the BET specific surface area of the alumina is less than 3 $m^2/g$, it is difficult to adsorb and remove $SiO_2$ sufficiently, and therefore the BET specific surface area of the alumina is preferably 3 $m^2/g$ or more. On the other hand, when the BET specific surface area of the alumina exceeds 10 $m^2/g$, a viscosity of the annealing separator slurry becomes too high, coating spots occur, and portions at which $SiO_2$ cannot be sufficiently adsorbed and removed are formed, and therefore the BET specific surface area of the alumina is preferably 10 $m^2/g$ or less.

Even when the annealing separator in the above-described range of the BET specific surface area is used, if the application amount of the annealing separator is insufficient, $SiO_2$ cannot be adsorbed and removed sufficiently, and the needle-like inclusions (mullite) are formed.

After the final annealing, a coating liquid containing colloidal silica is applied to the steel sheet from which a surplus annealing separator has been removed by washing with water, and the colloidal silica is baked to form a tension-insulation coating. As described above, a grain-oriented electrical steel sheet having a low iron loss in which the forsterite film is not present between the base steel sheet and the tension-insulation coating can be obtained.

EXAMPLE

Next, examples of the present invention will be described, but each of conditions in the examples is one condition example employed for ascertaining feasibility and elTects of the present invention, and the present invention is not limited to each of the condition examples. Also, the present invention can employ various conditions as long as the object of the present invention is achieved w ithout departing from the gist of the present invention.

Example 1

Slabs having component compositions shown in Table 1 were each heated to 1100° C. to be subjected to hot rolling to obtain a hot band having a sheet thickness of 2.6 mm, and the hot band was subjected to hot-band annealing at 1100° C., and then subjected to one cold rolling or a plurality of times of cold rolling with intermediate annealing sandwiched therebetween to obtain a steel sheet with a final thickness of 0.23 mm.

TABLE 1

| Steel | Steel slab chemical composition (mass %) (remainder is Fe and impurities) | | | | | | |
|---|---|---|---|---|---|---|---|
| No. | C | Si | Mn | Al | N | S | B |
| A1 | 0.085 | 3.45 | 0.10 | 0.028 | 0.0040 | 0.008 | 0.0015 |
| A2 | 0.031 | 1.21 | 0.10 | 0.029 | 0.0100 | 0.009 | 0.0020 |
| A3 | 0.033 | 6.52 | 0.10 | 0.029 | 0.0100 | 0.007 | 0.0018 |
| A4 | 0.041 | 3.45 | 0.08 | 0.028 | 0.0070 | 0.005 | 0.0019 |
| A5 | 0.044 | 3.33 | 0.80 | 0.029 | 0.0060 | 0.004 | 0.0021 |
| A6 | 0.052 | 4.52 | 0.12 | 0.020 | 0.0050 | 0.003 | 0.0016 |
| A7 | 0.055 | 3.12 | 0.09 | 0.055 | 0.0017 | 0.001 | 0.0017 |
| A8 | 0.061 | 2.81 | 0.09 | 0.030 | 0.0120 | 0.009 | 0.0018 |

TABLE 1-continued

| Steel No. | Steel slab chemical composition (mass %) (remainder is Fe and impurities) | | | | | | |
|---|---|---|---|---|---|---|---|
| | C | Si | Mn | Al | N | S | B |
| A9 | 0.062 | 3.12 | 0.11 | 0.030 | 0.0040 | 0.001 | 0.0019 |
| A10 | 0.071 | 2.92 | 0.13 | 0.030 | 0.0050 | 0.001 | 0.0021 |

The above-described steel sheets were each rewound to be subjected to decarburization annealing at 820° C. in a humid atmosphere of 75% hydrogen, 25% nitrogen, and a dew point of 40° C., and then were each subjected to nitriding annealing in which annealing was performed in an ammonia atmosphere for the purpose of forming an inhibitor AlN in each of the steel sheets. Thereafter, an aqueous slurry of an annealing separator containing alumina with a BET specific surface area of 3 to 10 m$^2$/g and 0 to 80% by mass of MgO was applied to a steel sheet surface while varying an application amount of a solid content of the annealing separator per side in a range of 5 to 15 g/m$^2$, and then the steel sheet was wound in a coil shape.

The coil-shaped steel sheet that had been coated with the above-described annealing separator and dried was subjected to final annealing at 1200° C. for 20 hours. After the final annealing, a surplus annealing separator was removed from the steel sheet by washing with water to obtain a grain-oriented electrical steel sheet in which secondary recrystallization was completed.

Components of a base steel sheet in the manufactured grain-oriented electrical steel sheet were measured using ICP-AES. Acid-soluble Al was measured by the ICP-AES using a filtrate obtained after the sample was decomposed by heating with an acid. Also, C and S were measured using a combustion-infrared absorption method, N was measured using an inert gas fusion-thermal conductivity method, and O was measured using an inert gas fusion-nondispersive infrared absorption method.

A test piece of 20 mm square was taken from a central portion in a width direction of an outermost circumference of the coil-shaped grain-oriented electrical steel sheet obtained in this way, a cross section (C cross section) perpendicular to a rolling direction was polished with a diamond buff, the cross section of one side (20 mm) of the test piece was observed with a microscope (1000 times), and the number of needle-like inclusions having a length of 1 μm or more present in the observation region having a sheet thickness direction length of 10 μm and a sheet width direction length of 20 mm was measured. Identification of substances constituting the needle-like inclusions was performed by the following methods. The test piece cut out from the base steel sheet was immersed in a nital solution (5 vol % of nitric acid/ethanol) for 90 seconds, and a surface thereof was removed by about several microns to make needle-like inclusions appear. The surface of the test piece on which the needle-like inclusions had appeared was analyzed by a wide-angle X-ray diffraction method. Further, ascertaining of the needle-like inclusions that had appeared was performed using an optical microscope. Specifically, an obtained X-ray diffraction spectrum was collated with a data of JCPDS No.: 15-776. Also, the iron loss $W_{17/50}$ of the test piece was measured according to JIS C 2550:2011. Chemical compositions of the obtained grain-oriented electrical steel sheets are shown in Table 2, and evaluation results are shown in Table 3.

TABLE 2

| | No. | Steel No. | Product steel chemical composition (mass %) (remainder is Fe and impurities) | | | | | | |
|---|---|---|---|---|---|---|---|---|---|
| | | | C | Si | Mn | Al | N | S | B |
| Invention example | B1 | A1 | ≤0.002 | 3.45 | 0.10 | ≤0.002 | ≤0.003 | ≤0.002 | 0.0015 |
| | B2 | A2 | ≤0.002 | 1.21 | 0.10 | ≤0.002 | ≤0.003 | ≤0.002 | 0.0020 |
| | B3 | A3 | ≤0.002 | 6.52 | 0.10 | ≤0.002 | ≤0.003 | ≤0.002 | 0.0018 |
| | B4 | A4 | ≤0.002 | 3.45 | 0.08 | ≤0.002 | ≤0.003 | ≤0.002 | 0.0019 |
| | B5 | A5 | ≤0.002 | 3.33 | 0.80 | ≤0.002 | ≤0.003 | ≤0.002 | 0.0021 |
| | B6 | A6 | ≤0.002 | 4.52 | 0.12 | ≤0.002 | ≤0.003 | ≤0.002 | 0.0016 |
| | B7 | A7 | ≤0.002 | 3.12 | 0.09 | ≤0.002 | ≤0.003 | ≤0.002 | 0.0017 |
| | B8 | A8 | ≤0.002 | 2.81 | 0.09 | ≤0.002 | ≤0.003 | ≤0.002 | 0.0018 |
| | B9 | A9 | ≤0.002 | 3.12 | 0.11 | ≤0.002 | ≤0.003 | ≤0.002 | 0.0019 |
| | B10 | A10 | ≤0.002 | 2.92 | 0.13 | ≤0.002 | ≤0.003 | ≤0.002 | 0.0021 |
| Comparative example | b1 | A4 | ≤0.002 | 3.45 | 0.08 | ≤0.002 | ≤0.003 | ≤0.002 | 0.0019 |
| | b2 | A4 | ≤0.002 | 3.45 | 0.08 | ≤0.002 | ≤0.003 | ≤0.002 | 0.0019 |
| | b3 | A4 | ≤0.002 | 3.45 | 0.08 | ≤0.002 | ≤0.003 | ≤0.002 | 0.0019 |
| | b4 | A4 | ≤0.002 | 3.45 | 0.08 | ≤0.002 | ≤0.003 | ≤0.002 | 0.0019 |
| | b5 | A4 | ≤0.002 | 3.45 | 0.08 | ≤0.002 | ≤0.003 | ≤0.002 | 0.0019 |
| | b6 | A4 | ≤0.002 | 3.45 | 0.08 | ≤0.002 | ≤0.003 | ≤0.002 | 0.0019 |
| | b7 | A4 | ≤0.002 | 3.45 | 0.08 | ≤0.002 | ≤0.003 | ≤0.002 | 0.0019 |
| | b8 | A4 | ≤0.002 | 3.45 | 0.08 | ≤0.002 | ≤0.003 | ≤0.002 | 0.0019 |
| | b9 | A4 | ≤0.002 | 3.45 | 0.08 | ≤0.002 | ≤0.003 | ≤0.002 | 0.0019 |
| | b10 | A4 | ≤0.002 | 3.45 | 0.08 | ≤0.002 | ≤0.003 | ≤0.002 | 0.0019 |
| | b11 | A4 | ≤0.002 | 3.45 | 0.08 | ≤0.002 | ≤0.003 | ≤0.002 | 0.0019 |
| | b12 | A4 | ≤0.002 | 3.45 | 0.08 | ≤0.002 | ≤0.003 | ≤0.002 | 0.0019 |
| | b13 | A4 | ≤0.002 | 3.45 | 0.08 | ≤0.002 | ≤0.003 | ≤0.002 | 0.0019 |
| | b14 | A4 | ≤0.002 | 3.45 | 0.08 | ≤0.002 | ≤0.003 | ≤0.002 | 0.0019 |
| | b15 | A4 | ≤0.002 | 3.45 | 0.08 | ≤0.002 | ≤0.003 | ≤0.002 | 0.0019 |

TABLE 3

| No. | | Steel No. | Annealing separator | | Needle-like inclusions having length of 1 μm or more (pcs/20 mm) | Iron loss $W_{17/50}$ (W/kg) | Presence or absence of forsterite formation |
| --- | --- | --- | --- | --- | --- | --- | --- |
| | No. | | Amount of MgO (mass %) | Application amount (g/m²) | | | |
| Invention example | B1 | A1 | 28 | 6.0 | 0 | 0.98 | Absent |
| | B2 | A2 | 32 | 6.4 | 0 | 0.89 | Absent |
| | B3 | A3 | 34 | 7.1 | 0 | 0.87 | Absent |
| | B4 | A4 | 35 | 7.8 | 0 | 0.85 | Absent |
| | B5 | A5 | 36 | 8.2 | 0 | 0.84 | Absent |
| | B6 | A6 | 38 | 9.0 | 0 | 0.83 | Absent |
| | B7 | A7 | 40 | 9.5 | 0 | 0.81 | Absent |
| | B8 | A8 | 45 | 10.8 | 0 | 0.82 | Absent |
| | B9 | A9 | 48 | 11.1 | 0 | 0.84 | Absent |
| | B10 | A10 | 50 | 12.0 | 0 | 0.82 | Absent |
| Comparative example | b1 | A4 | 0 | 10.0 | 54 | 1.43 | Absent |
| | b2 | A4 | 12 | 10.0 | 38 | 1.20 | Absent |
| | b3 | A4 | 22 | 10.0 | 2 | 1.24 | Absent |
| | b4 | A4 | 60 | 10.0 | 0 | 1.21 | Present |
| | b5 | A4 | 80 | 10.0 | 0 | 1.48 | Present |
| | b6 | A4 | 28 | 5 | 49 | 1.24 | Absent |
| | b7 | A4 | 32 | 4.2 | 42 | 1.19 | Absent |
| | b8 | A4 | 34 | 4.5 | 38 | 1.17 | Absent |
| | b9 | A4 | 35 | 4.8 | 14 | 1.14 | Absent |
| | b10 | A4 | 36 | 4.9 | 10 | 1.01 | Absent |
| | b11 | A4 | 38 | 5.1 | 20 | 1.11 | Absent |
| | b12 | A4 | 40 | 5 | 12 | 1.08 | Absent |
| | b13 | A4 | 45 | 5.1 | 39 | 1.21 | Absent |
| | b14 | A4 | 48 | 4.9 | 58 | 1.32 | Absent |
| | b15 | A4 | 50 | 5.2 | 41 | 1.24 | Absent |

As shown in Table 2, base steel sheets of B1 to B10 and b1 to b15 contained 0.002% by mass or less of C, 1.21 to 6.52% by mass of Si, 0.08 to 0.80% by mass of Mn, 0.002% by mass or less of acid-soluble Al, 0.002% by mass or less of S, 0.003% by mass or less of N, 0.0015 to 0.0021% by mass of B, and included a remainder of Fe and impurities as chemical compositions thereof.

As shown in Table 3, in invention examples B1 to B10, as a result of controlling the amount of MgO in the annealing separator within the range of 28% by mass to 50% by mass and controlling the application amount of the annealing separator within a range of 6.0 to 12.0 g/m² per side, the needle-like inclusions (mullite) with a length of 1 μm or more were not present in the observation region of each of the base steel sheets, and the iron loss $W_{17/50}$ was suppressed to less than 1.00 W/kg. Also, the grain-oriented electrical steel sheets of invention examples B1 to B10 did not have the forsterite film and had mirror gloss.

As shown in Table 3, in comparative examples b1 to b3, since the amount of MgO in the annealing separator was less than 28% by mass while the application amount of the annealing separator was controlled in the range of 6.0 to 12.0 g/m² per side, a plurality of needle-like inclusions (mullite) with a length of 1 μm or more were present in the observation region of the base steel sheet, and the iron loss $W_{17/50}$ increased to more than 1.00 W/kg.

In comparative examples b4 and b5, the amount of MgO in the annealing separator was more than 50% by mass while the application amount of the annealing separator was controlled in the range of 6.0 to 12.0 g/m² per side. In this case, the needle-like inclusions (mullite) with a length of 1 μm or more were not present in the observation region of the base steel sheet, but the forsterite was formed, and as a result, the iron loss $W_{17/50}$ increased to more than 1.00 W/kg.

In comparative example b6, since the application amount of the annealing separator was less than 6.0 g/m² per side while the amount of MgO in the annealing separator was 28% by mass or more, a plurality of needle-like inclusions (mullite) with a length of 1 μm or more were present in the observation region of the base steel sheet, and the iron loss $W_{17/50}$ increased to more than 1.00 W/kg.

In comparative examples b7 to b15, since the application amount of the annealing separator was less than 6.0 g/m² per side while the amount of MgO in the annealing separator was controlled in the range of 28% by mass to 50% by mass, a plurality of needle-like inclusions (mullite) with a length of 1 μm or more were present in the observation region of the base steel sheet, and the iron loss $W_{17/50}$ increased to more than 1.00 W/kg.

Example 2

A slab having a component composition of steel No. A5 shown in Table 1 was heated to 1100° C. to be subjected to hot rolling to obtain a hot-rolled steel sheet of 2.60 mm, and the hot-rolled steel sheet was subjected to hot-band annealing at 1100° C., and then subjected to a plurality of times of cold rolling with intermediate annealing sandwiched therebetween to obtain a steel sheet with a final thickness of 0.23 mm.

The above-described steel sheet was rewound to be subjected to decarburization annealing at 820° C. in a humid atmosphere of 75% hydrogen, 25% nitrogen, and a dew point of 40° C., and then was subjected to nitriding annealing in which annealing was performed in an ammonia atmosphere for the purpose of forming an inhibitor AlN in the steel sheet.

Thereafter, an aqueous slurry of an annealing separator containing alumina with a BET specific surface area varied in a range of 3.0 to 10.0 m²/g and 35.0 to 48.0% by mass of MgO was applied to the steel sheet surface while varying an application amount of a solid content of the annealing separator per side in a range of 8.2 to 11.2 g/m², and then the steel sheet was wound in a coil shape.

The coil-shaped steel sheet that had been coated with the above-described annealing separator and dried was subjected to final annealing at 1200° C. for 20 hours. After the final annealing, a surplus annealing separator was removed from the steel sheet by washing with water to obtain a grain-oriented electrical steel sheet which had no forsterite film and had mirror gloss and in which secondary recrystallization had been completed.

A test piece of 20 mm square was taken from a central portion in a width direction of an outermost circumference of the coil-shaped grain-oriented electrical steel sheet obtained in this way, a cross section (C cross section) perpendicular to a rolling direction was polished with a diamond buff, the cross section of one side (20 mm) of the test piece was observed with a microscope (1000 times), and the number of needle-like inclusions having a length of 1 μm or more present in the observation region having a sheet thickness direction length of 10 μm and a sheet width direction length of 20 mm was measured. Also, the iron loss $W_{17/50}$ of the test piece was measured according to JIS C 2550:2011. Chemical compositions of the obtained grain-oriented electrical steel sheets are shown in Table 4, and evaluation results are shown in Table 5.

TABLE 4

| Steel | | Product steel chemical composition (mass %) (remainder is Fe and impurities) | | | | | |
|---|---|---|---|---|---|---|---|
| No. | No. | C | Si | Mn | Al | N | S | B |
| C1 | A5 | ≤0.002 | 3.33 | 0.80 | ≤0.002 | ≤0.003 | ≤0.002 | 0.0021 |
| C2 | A5 | ≤0.002 | 3.33 | 0.80 | ≤0.002 | ≤0.003 | ≤0.002 | 0.0021 |
| C3 | A5 | ≤0.002 | 3.33 | 0.80 | ≤0.002 | ≤0.003 | ≤0.002 | 0.0021 |
| C4 | A5 | ≤0.002 | 3.33 | 0.80 | ≤0.002 | ≤0.003 | ≤0.002 | 0.0021 |
| C5 | A5 | ≤0.002 | 3.33 | 0.80 | ≤0.002 | ≤0.003 | ≤0.002 | 0.0021 |

TABLE 5

| | | | Annealing separator | | Alumina BET specific surface area (m²/g) | Needle-like inclusions having length of 1 μm or more (pcs/20 mm) | Iron loss $W_{17/50}$ (W/kg) | Presence or absence of forsterite formation |
|---|---|---|---|---|---|---|---|---|
| No. | | Steel No. | Amount of MgO (mass %) | Application amount (g/m²) | | | | |
| Invention example | C1 | A5 | 35 | 8.2 | 3.0 | 0 | 0.88 | Absent |
| | C2 | A5 | 38 | 9.8 | 4.8 | 0 | 0.84 | Absent |
| | C3 | A5 | 42 | 10.1 | 6.2 | 0 | 0.80 | Absent |
| | C4 | A5 | 45 | 10.8 | 7.5 | 0 | 0.77 | Absent |
| | C5 | A5 | 48 | 11.2 | 10.0 | 0 | 0.72 | Absent |

As shown in Table 4, the base steel sheets of C1 to C5 contained 0.002% by mass or less of C, 3.33% by mass of Si, 0.80% by mass of Mn, 0.002% by mass or less of acid-soluble Al, 0.002% by mass or less of S, 0.003% by mass or less of N, 0.0021% by mass of B, and included a remainder of Fe and impurities as chemical compositions thereof.

As shown in Table 5, it can be seen that the iron loss $W_{17/50}$ could be significantly reduced by controlling the amount of MgO in the annealing separator within the range of 28% by mass to 50% by mass, controlling the application amount of the annealing separator within the range of 6.0 to 12.0 g/m² per side, and furthermore, controlling the BET specific surface area of the alumina, which was a main component of the annealing separator, within a range of 3.0 to 10.0 m²/g. It is conceivable that this is because the needle-like inclusions are not formed, and moreover, the amount of $SiO_2$ adsorbed by the alumina is increased.

INDUSTRIAL APPLICABILITY

According to the present invention, in a grain-oriented electrical steel sheet in which a forsterite film is not present between a base steel sheet and a tension-insulation coating, it is possible to provide a grain-oriented electrical steel sheet in which iron loss can be significantly reduced and to which a tension-insulation coating having lower iron loss than that of conventional cases is provided. Therefore, the present invention has high applicability in an electrical steel sheet manufacturing industry and an industry of utilizing the electrical steel sheet.

The invention claimed is:

1. A grain-oriented electrical steel sheet in which a forsterite film is not present between a base steel sheet and a tension-insulation coating, wherein
the base steel sheet contains:
0.085% by mass or less of C;
0.80 to 7.00% by mass of Si;
0.05 to 1.00% by mass of Mn:
0.065% by mass or less of acid-soluble Al;
0.003% by mass or less of S;
0.0040% by mass or less of N;
0.0005 to 0.0080% by mass of B;
0 to 0.50% by mass of P;
0 to 1.00% by mass of Ni;
0 to 0.30% by mass of Sn;
0 to 0.30% by mass of Sb;
0 to 0.40% by mass of Cu;
0 to 0.30% by mass of Cr;
0 to 0.01% by mass of Bi; and
a remainder of Fe and impurities as a chemical composition thereof, and
in a case in which a cross section perpendicular to a rolling direction of the base steel sheet is viewed, when a region having a length of 10 μm from a surface of the base steel sheet toward the inside of the base steel sheet in a sheet thickness direction of the base steel sheet and a length of 20 mm in a direction perpendicular to the sheet thickness direction is an observation region, needle-like inclusions having a length of 1 μm or more are not present in the observation region.

2. The grain-oriented electrical steel sheet according to claim 1, wherein the needle-like inclusion contains mullite represented by $3Al_2O_3 \cdot 2SiO_2$.

* * * * *